United States Patent [19]

Ito

[11] Patent Number: 4,648,111
[45] Date of Patent: Mar. 3, 1987

[54] SELF-ADAPTIVE ECHO CANCELLER CAPABLE OF KEEPING A DEGREE OF CANCELLATION SUBSTANTIALLY INVARIABLE EVEN AT A LOW INCOMING LEVEL

[75] Inventor: Yoshinori Ito, Tokyo, Japan

[73] Assignee: NEC Corporation, Tokyo, Japan

[21] Appl. No.: 536,093

[22] Filed: Sep. 27, 1983

[30] Foreign Application Priority Data

Sep. 29, 1982 [JP] Japan ................. 57-168610

[51] Int. Cl.$^4$ ............................. H04B 3/20
[52] U.S. Cl. ................... 379/411; 379/410
[58] Field of Search .......... 179/170.2, 170.6, 170.8; 320/32

[56] References Cited

U.S. PATENT DOCUMENTS

| | | | |
|---|---|---|---|
| 3,922,505 | 11/1975 | Höge | 179/170.2 |
| 4,064,379 | 12/1977 | Horna | 179/170.2 |
| 4,479,036 | 10/1984 | Yamamoto et al. | 179/170.2 |

FOREIGN PATENT DOCUMENTS

| | | | |
|---|---|---|---|
| 2427102 | 12/1975 | Fed. Rep. of Germany | 179/170.2 |
| 2501438 | 9/1982 | France | 179/170.2 |

Primary Examiner—Gene Z. Rubinson
Assistant Examiner—R. Vaas
Attorney, Agent, or Firm—Sughrue, Mion, Zinn, Macpeak and Seas

[57] ABSTRACT

In a self-adpative echo canceller responsive to a receive-in signal and an echo signal resulting from the receive-in signal, a learning identification technique is implemented so as to exempt a send-out signal from the echo signal by successively varying an amount of modification ($\Delta h_j'$) represented by $\beta eX$, where $\beta$ represents a coefficient; e, a level of the send-out signal; and X, a level of the receive-in signal. A coefficient calculating circuit (28, 30, 35) calculates the coefficient $\beta$ from the factor and an incoming level (X) of the receive-in signal to determine the amount of modification. The coefficient is accompanied by a modifier given by $2\overline{X^2}/(K+\overline{X^2})$, where K represents a constant. The coefficient calculating circuit includes a unit (35) for calculating the modifier. The modifier may be multiplied by various factors of the amount of modification.

4 Claims, 6 Drawing Figures

001
SELF-ADAPTIVE ECHO CANCELLER CAPABLE OF KEEPING A DEGREE OF CANCELLATION SUBSTANTIALLY INVARIABLE EVEN AT A LOW INCOMING LEVEL

BACKGROUND OF THE INVENTION

This invention relates to a self-adaptive echo canceller for use in self-adaptively cancelling an echo in a long-distance telephone network, more particularly, in a satellite communication network.

In a long-distance telephone network, a long delay inevitably takes place on communication and gives rise to an echo in a speech channel. Such an echo should be suppressed because it deteriorates quality of communication. For this purpose, use was made of an echo suppressor which is for suppressing the echo by switching a speech channel on and off. The echo suppressor, however, causes troubles, such as occurrence of click noises, an initial interruption of a speech, or the like.

A conventional self-adaptive echo canceller has been proposed so as to avoid the above-mentioned troubles. An echo canceller for use in connection to a subscriber's substation has a receive-in terminal for receiving a receive-in signal from a remote party, a receive-out terminal for supplying the substation with a receive-out signal, a send-in terminal for receiving a send-in signal from the substation, and a send-out terminal for sending a send-out signal to the remote party. In the manner known in the art, the echo canceller is for cancelling an echo signal which results from the receive-in signal between the receive-out and the send-in terminals. In this matter, and echo path is formed between the receive-out and the send-in terminals. As a result, the send-in terminal is supplied with the echo signal resulting from the receive-in signal.

As will later be described in conjunction with one figure of the accompanying drawing, the conventional self-adaptive echo canceller provides a model of the echo path by the use of a learning identification technique to produce an echo estimation signal approximate to the echo signal and cancels the echo signal by subtracting the echo estimation signal from the echo signal.

It should be noted here that a degree of cancellation of the echo signal is reduced with the self-adaptive echo canceller as a level of the receive-in signal is lowered. In addition, noise occurs in the echo path and in the echo canceller itself. As a result, the influence of the noise becomes serious when the receive-in signal is weak. In other words, the degree of cancellation is degraded as the level of the receive-in signal becomes low.

SUMMARY OF THE INVENTION

It is an object of this invention to provide a self-adaptive echo canceller wherein a degree of cancellation is sufficient and stable enough even when a receive-in signal has a low level.

A self-adaptive echo canceller to which this invention is applicable is responsive to a receive-in and a send-in signal for producing a send-out signal in which an echo signal resulting from the receive-in signal is cancelled by the use of a learning identification technique implemented by echo signal estimating means. The echo signal estimating means is responsive to a factor signal representative of a factor and to the receive-in and the send-out signals for estimating the echo signal to produce an echo estimation signal. The echo canceller includes subtracting means for subtracting the echo estimation signal from the send-in signal to produce the send-out signal. The echo signal estimating means includes level signal producing means responsive to the receive-in signal for producing a level signal representative of a variable incoming level of the receive-in signal. According to this invention, the echo signal estimating means comprises coefficient calculating means responsive to the factor signal and the level signal for calculating a coefficient by the said factor and the incoming level to produce a coefficient signal representative of the coefficient and signal modifying means responsive to the level signal, the coefficient signal and the send-out signal for modifying the echo estimation signal in compliance with the coefficient and a variable outgoing level taken by the send-out signal.

BRIEF DESCRIPTION OF THE DRAWNG

DESCRIPTION OF THE PREFERRED EMBODIMENTS

Figure 1:
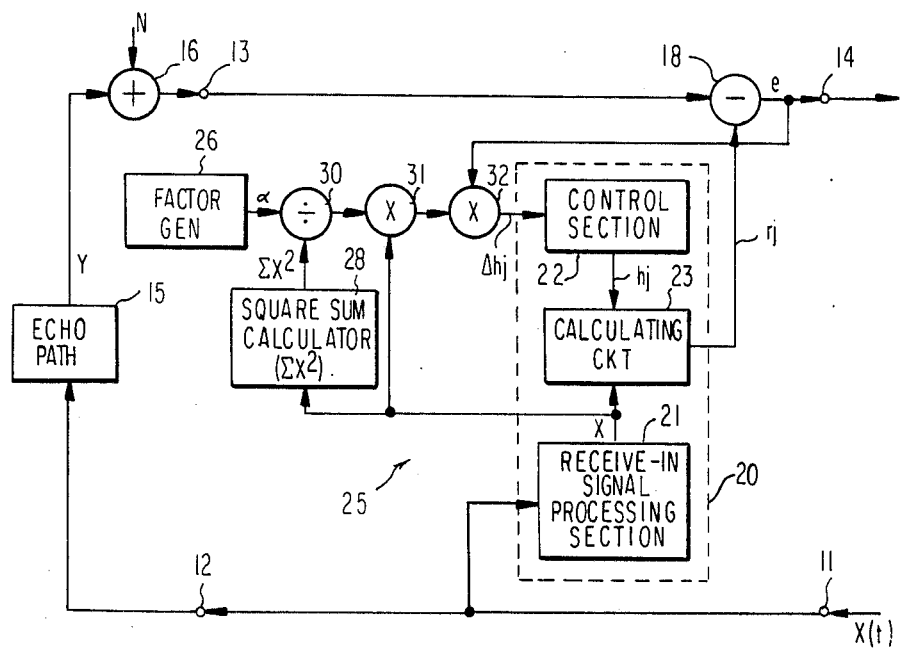
FIG. 1 shows a block diagram of a conventional self-adaptive echo canceller together with an echo path.

Referring to FIG. 1, a conventional self-adaptive echo canceller will be described at first for a better understanding of this invention. The echo canceller comprises a receive-in terminal 11 for receiving a receive-in signal X(t) of a variable incoming level from a remote party (not shown), a receive-out terminal 12 for producing the receive-in signal as a receive-out signal, a send-in terminal 13 for receiving a send-in signal, and a send-out terminal 14 for sending a send-out signal of an outgoing level to the remote party.

The receive-in signal X(t) is given to the send-in terminal 13 through the receive-out terminal 12 and an echo path 15 which may comprise a four-wire to two-wire hybrid. Accordingly, an echo signal Y which results from the receive-in signal X(t) is supplied as the send-in signal to the send-in terminal 13. Noise N is added to the send-in signal in the echo path 15 and in the echo canceller. As shown in FIG. 1, addition of the noise N may be symbolized by an adder 16 responsive to the noise N. The noise N is left out of consideration for a while in the following description. It is mentioned here that the echo path 15 has an echo path characteristic.

The illustrated echo canceller is operable to exempt the send-out signal from the echo signal Y. More specifically, the echo canceller simulates the echo path characteristic by the use of a learning identification technique described by Jin-ichi Nagumo et al in IEEE Transactions on Automatic Control, Vol. AC-12 (1967), No. 3, pp. 282–287. The learning identification technique is implemented so as to define an estimated echo path characteristic and to make the estimated echo path characteristic equal to the echo path characteristic. For this purpose, an echo estimation signal $r_j$ is calculated at a time instant j in accordance with the estimated echo path characteristic and subtracted from the echo signal Y to produce an error signal e representative of an error between the echo signal Y and the echo estimation signal $r_j$. The error signal e is sent as the send-out signal through the send-out terminal 14 to the remote party. In order to reduce the error, adjustment procedure is successively carried out by the use of the following formula:

$$\Delta h_j = (\alpha e X)/\Sigma X^2, \quad (1)$$

where $\Delta h_j$ is representative of an amount of modification at the time instant j; and $\alpha$, an error-correcting factor. Thus, the adjustment procedure is for successively modifying the amount $\Delta h_j$ of modification to make the estimated echo path characteristic approach the echo path characteristic.

In FIG. 1, the echo canceller is divided into an echo estimating circuit for producing the echo estimation signal $r_j$ in a manner to be described and a subtractor 18 for subtracting the echo estimation signal $r_j$ from the send-in signal (Y) to produce the send-out signal (e). The echo estimating circuit comprises a transversal filter 20 as illustrated by Horna in U.S. Pat. No. 4,064,379. The transversal filter 20 comprises a receive-in signal processing section 21 for processing the receive-in signal X(t) to produce a level signal X representative of the variable incoming level. The receive-in signal processing section 21 may be referred to as a level signal producing circuit and may be a combination of an analog-to-digital converter, a multiplexer, and a receive-in signal register, which are all described in the above-referenced patent. The receive-in register is for storing a predetermined number of samples each of which is sampled at each time instant and successively shifted.

The transversal filter 20 comprises a control section 22 responsive to a modification signal representative of the amount $\Delta h_j$ of modification. The control section 22 comprises a coefficient register for successively storing h-coefficients modified by the amount $\Delta h_j$ of modification. The h-coefficients serve to determine the estimated echo path characteristic and are successively produced as a coefficient signal $h_j$ in a time division fashion one at a time. The h-coefficient is called a preselected coefficient depending on the circumstances and may be represented again by $h_i$.

The coefficient signal $h_j$ is sent to a calculating circuit 23 together with the level signal X. The calculating circuit 23 comprises a multiplier for multiplying the variable incoming level by the h-coefficient to successively produce a product signal representative of a product of the both and an accumulator for successively accumulating each product to produce a result of accumulation as the estimation echo signal $r_j$, as is the case with the above-reference patent.

In order to calculate the amount $\Delta h_j$ of modification in accordance with the formula (1), a modifying circuit 25 cooperates with the transversal filter 20. The modifying circuit 25 comprises a factor generator 26 for generating a factor signal which is representative of the error-correcting factor $\alpha$ and which is indicated by the same reference symbol as the error-correcting factor. The error-correcting factor $\alpha$ is between 2 and 0, both exclusive, and determined in consideration of an identification time as pointed out by Nagumo et al in the above-mentioned paper. Anyway, the error-correcting factor $\alpha$ is invariable if the identification time is constant. Therefore, the factor generator 26 may be a constant voltage circuit.

The modifying circuit 25 is for calculating the amount $\Delta h_j$ of modification in compliance with the formula (1) and comprises a calculator 28 for calculating $\Sigma X^2$, namely, a square sum of X to produce a square sum signal representative of $\Sigma X^2$. The calculator 28 may comprise a multiplier for calculating the square of X and an accumulator for accumulating the square of X.

Responsive to the error-correcting factor $\alpha$ and the square sum signal, a divider 30 divides the error-correcting factor $\alpha$ by $\Sigma X^2$ to deliver a result of division to a first multiplication circuit 31 supplied with the level signal X from the receive-in signal processing section 21. The first multiplication circuit 31 multiplies the result of division by the incoming level X (the reference symbol of the level signal being used) to send a result of multiplication to a second multiplication circuit 32 responsive to the error signal e. Thus, the second multiplication circuit 32 produces a modification amount signal ($\Delta h_j$) represented by the formula (1).

With this structure, cancellation of the echo signal Y is corrected out by subtraction of the echo estimation signal $r_j$. In the meanwhile, let a degree C of cancellation be defined in the illustrated echo canceller. As is known in the art, the noise N should be taken into account together with the factor $\alpha$ and the echo signal Y to define the degree C of cancellation. More specifically, the degree C of cancellation is given by:

$$C = (2-\alpha) \cdot \overline{Y^2}/\alpha \overline{N^2} \quad (2)$$

where $\overline{Y^2}$ is representative of a mean source of Y and $\overline{N^2}$, a mean square of N. As readily understood from Equation (2), the degree C of cancellation becomes low with a reduction of the echo signal Y. Inasmuch as the degree C of cancellation is in proportion to the variable incoming level X, it is rendered low as the receive-in signal X(t) becomes weak, as described in the preamble of the instant specification.

Figure 2:
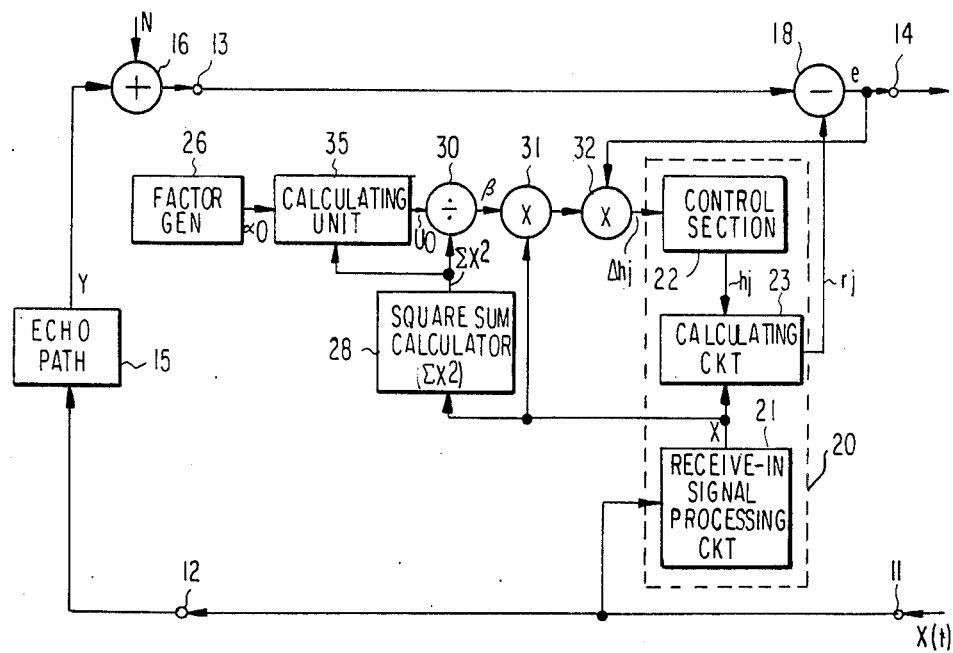
FIG. 2 shows a similar view of a self-adaptive echo canceller according to a first embodiment of this invention.

Referring to FIG. 2, a self-adaptive echo canceller according to a first embodiment of this invention comprises similar parts and signals designated by like reference numerals and symbols.

Before description of the illustrated echo canceller, a principle of this invention will be briefly described below. At first, it is assumed in this invention that the degree C of cancellation shown by Equation (2) is kept constant and the error-correcting factor $\alpha$ is variable. In this connection, the error-correcting factor will be represented by $\alpha_v$. Let the mean square $\overline{Y^2}$ in Equation (2) be represented by:

$$\overline{Y^2} = A\overline{X^2}, \quad (3)$$

where A is representative of a constant. This is because the echo signal Y is proportional to the variable incoming level X, as mentioned above. Substitution of Equation (3) into Equation (2) gives:

$$C = (2-\alpha_v)A\overline{X^2}/\alpha_v\overline{N^2}. \quad (4)$$

On the assumption that the degree C of cancellation is constant, Equation (4) is rewritten into:

$$\alpha_v = \overline{2X^2}/(B + \overline{X^2}),  \quad (5)$$

where B is equal to $C\overline{N^2}/A$. Inasmuch as the mean square $\overline{N^2}$ may be regarded as substantially invariable, the term B is substantially constant.

From Equation (5), it may be concluded that the degree C of cancellation becomes constant when the error-correcting factor $\alpha_v$ is varied in accordance with Equation (5). Equation (5) is not changed even when a constant $\alpha_0$ is multiplied on both sides of Equation (5). Therefore, calculation of $\alpha_v\alpha_0$ is practically carried out in the illustrated echo canceller. In this event, an amount $\Delta h_j'$ of modification can be given with reference to the formula (1) by:

$$\Delta h_j' = (2\alpha_0 e X\overline{X^2})/[(B+\overline{X^2})\Sigma X^2]. \quad (6)$$

As seen from the formula (6), the factor $(2\alpha_0\overline{X^2})/(B+\overline{X^2})$ is substituted for $\alpha$ in the formula (1). If the constant $\alpha_0$ is assumed to be equal to $\alpha$, the formula (6) is equivalent to the formula (1) multiplied by a modifier M of $2\overline{X^2}/(B+\overline{X^2})$. In this event, the modifier M may be considered as one multiplied by a preselected one of $\alpha_0$, $\Sigma X^2$, X, and e. In addition, the constant $\alpha_0$ may be afresh called an invariable error-correcting factor.

In FIG. 2, the invariable error-correcting factor $\alpha_0$ is multiplied by the modifier M. For this purpose, the illustrated echo canceller comprises a calculating unit 35 for calculating a partial factor represented by $2\alpha_0\overline{X^2}/(B+\overline{X^2})$. The calculating unit 35 is operable in response to the invariable error-correcting factor signal ($\alpha_0$) and the square sum signal ($\Sigma X^2$) supplied from the square sum calculator 28. Such a calculating unit 35 may comprise a mean square calculating portion for calculating a mean square $\overline{X^2}$ from the square sum $\Sigma X^2$, an adder for adding the constant B to the mean square $\overline{X^2}$ to provide a sum of $(B+\overline{X^2})$, a multiplier for multiplying the mean square $\overline{X^2}$ by $2\alpha_0$ to provide $2\alpha_0\overline{X^2}$, and a divider for dividing $2\alpha_0\overline{X^2}$ by $(B+\overline{X^2})$. The calculating unit 35 may comprise a read-only memory accessed by the square sum signal ($\Sigma X^2$) and the invariable error-correcting factor $\alpha_0$ for producing the above-mentioned partial factor.

Anyway, the calculating unit 35 serves to multiply the invariable error-correcting factor $\alpha_0$ by the modifier M to produce a unit output signal $U_0$ represented by $(2\alpha_0\overline{X^2})/(B+\overline{X^2})$. The unit output signal $U_0$ has a unit output level.

The unit output signal $U_0$ is supplied to a divider 30 to be divided by the square sum signal. As a result, the divider 30 produces a coefficient signal representative of a coefficient $\beta$ given by:

$$\beta = (2\alpha_0\overline{X^2})/[(B+\overline{X^2})\cdot\Sigma X^2]. \quad (7)$$

A combination of the square sum calculator 28, the calculating unit 35, and the divider 30 may therefore be referred to as a coefficient calculation circuit for calculating the coefficient $\beta$. As shown in FIG. 2, the coefficient calculation circuit is supplied with the factor signal ($\alpha_0$) and the level signal X so as to calculate the coefficient $\beta$.

The coefficient signal $\beta$ is successively supplied to the first and the second multipliers 31 and 32 to be multiplied by the variable incoming level X and the outgoing level (e), respectively. Thus, the second multiplier 32 produces a modification signal representative of the amount $\Delta h_j'$ of modification specified by Equation (6).

Supplied with the modification signal ($\Delta h_j'$), the control section 22 controls the h-coefficients to make the calculating circuit 23 modify the echo estimation signal in accordance with the h-coefficients in the manner described in Horna's patent. Thus, the control section 22 and the calculating circuit 23 cooperates with the first and the second multipliers 31 and 32. In this sense, a combination of the first and the second multipliers 31 and 32, the control section 22, and the calculating circuit 23 may be called a signal modifying circuit.

Figure 3:
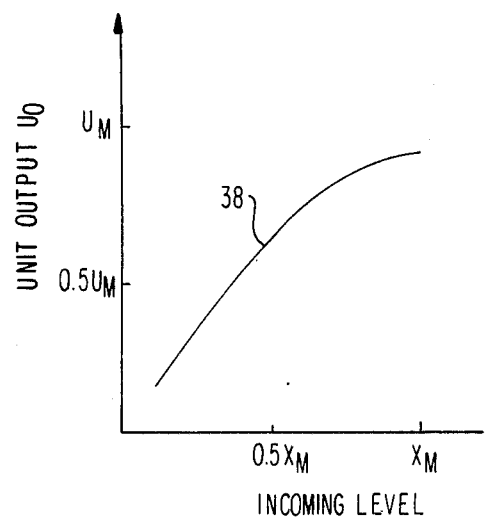
FIG. 3 shows a graphical representation for describing operation of the self-adaptive echo canceller illustrated in FIG. 2.

Referring to FIG. 3, the variable incoming level X taken along the abscissa is specified by a maximum level $X_M$ and a half level 0.5 $X_M$ while the unit ouput level ($U_0$) taken along the ordinate is likewise specified by a maximum output level $U_M$ and a half output level 0.5 $U_M$. As readily understood from a curve 38, the unit output level is steeply reduced when the invariable incoming level X is lower than 0.5 $X_M$. This means that the error-correcting factor $\alpha_v$ shown by Equation (5) equivalently becomes small with a decrease of the variable incoming level X and that the degree C of cancellation is kept substantially constant.

Figure 4:
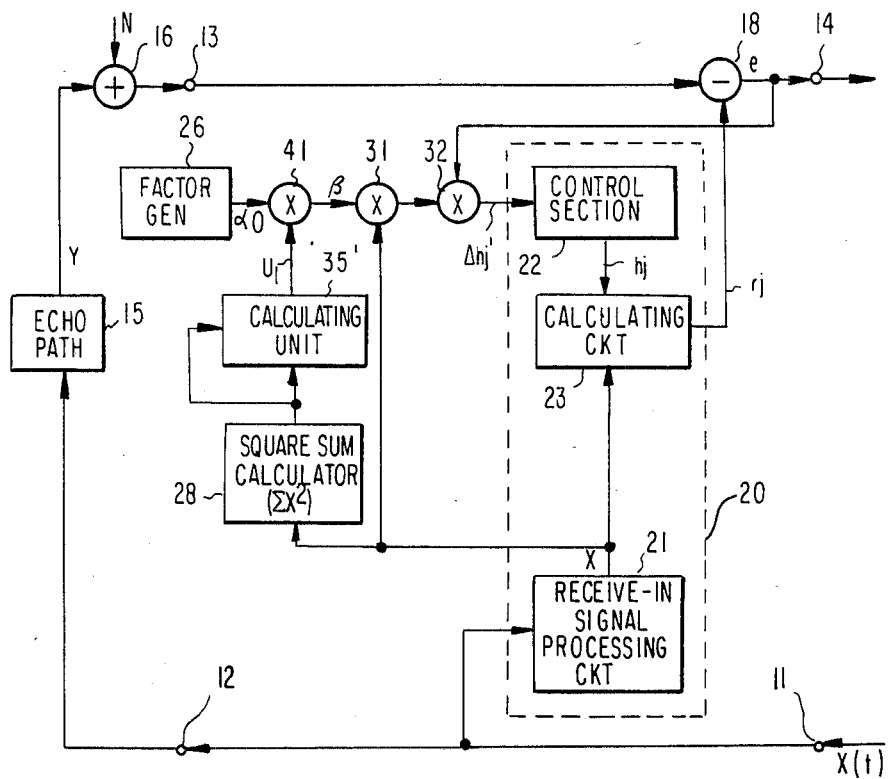
FIG. 4 shows a block diagram of a self-adaptive echo canceller according to a second embodiment of this invention together with an echo path.

Referring to FIG. 4, a self-adaptive echo canceller according to a second embodiment of this invention is similar to that illustrated in FIG. 2 except that a calculating unit 35' is somewhat different in structure from the unit 35 illustrated in FIG. 2 and that a third multiplier 41 is connected to the calculating unit 35' and the factor generator 26. The illustrated calculating unit 35' calculates that partial factor of the formula (6) which is represented by $(2\overline{X^2})/[(B+\overline{X^2})\Sigma X^2]$ in response to the square sum signal ($\Sigma X^2$) supplied from the square sum calculator 28. It may be said that the calculating circuit 35' is for modifying the square sum $\Sigma X^2$ into a modified square sum. The coefficient calculating unit 35' may comprise a mean square circuit for calculating the mean square $\overline{X^2}$ from the square sum $\Sigma X^2$, an adder for adding the mean square $\overline{X^2}$ to the constant B, and a divider for dividing the constant number "2" by $(B+\overline{X^2})$. A combination of the mean square circuit, the adder, and the divider is operable to calculate the modifier M described in conjunction with FIG. 2 and may be called a modifier calculating circuit. The coefficient calculating circuit 35' further comprises a multiplier for multiplying the modifier M by the square sum $\Sigma X^2$. All of the mean square circuit, the adder, the multiplier, and the divider are known in the art and are therefore described no longer. A read-only memory may be substituted for the above-mentioned elements, as mentioned in conjunction with FIG. 2.

Thus, the calculating unit 35' produces a unit output signal (depicted at $U_1$) representative of the above-mentioned partial factor. The unit output signal $U_1$ is sent to the third multiplier 41 responsive to the invariable error-correcting factor signal ($\alpha_0$). The third multiplier 41 supplies the first multiplier 31 with that result of multiplication which is given by $(2\alpha_0\overline{X^2})/[(B+\overline{X^2})\Sigma X^2]$. The result of multiplication is identical with the coefficient $\beta$ described in conjunction with FIG. 2 and may therefore be the coefficient $\beta$. Thus, a combination of the square sum calculator 28, the calculating unit 35', and the third multiplier 41 serves as a coefficient calculating circuit for calculating the coefficient $\beta$ to produce a coefficient signal representative of the coefficient $\beta$. The coefficient signal is successively multiplied by the variable incoming level X and the outgoing level (e) in the first and the second multipliers 31 and 32, respectively. As a result, the control section 22 is supplied with the modification amount signal ($\Delta h_j'$) specified by the formula (6).

Figure 5:
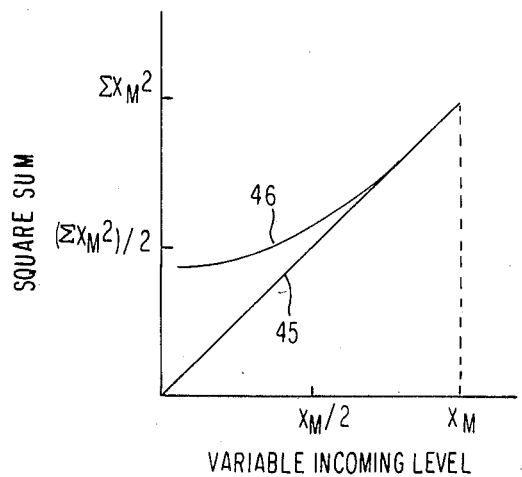
FIG. 5 shows a graphical representation for describing operation of the self-adaptive echo canceller illustrated in FIG. 4.

Referring to FIG. 5, a curve 45 shows a relationship between the variable incoming level X and the square sum, namely, a non-modified square sum $\Sigma X^2$, while another curve 46, a relationship between the variable incoming level X and the modified square sum described in conjunction with FIG. 4. As readily understood from the curves 45 and 46, the modified square sum is larger than the non-modified square sum when the incoming level is relatively low. This means that the error-correcting factor $\alpha_v$ shown by Equation (5) equivalently becomes small wih a reduction of the incoming level (X).

Figure 6:
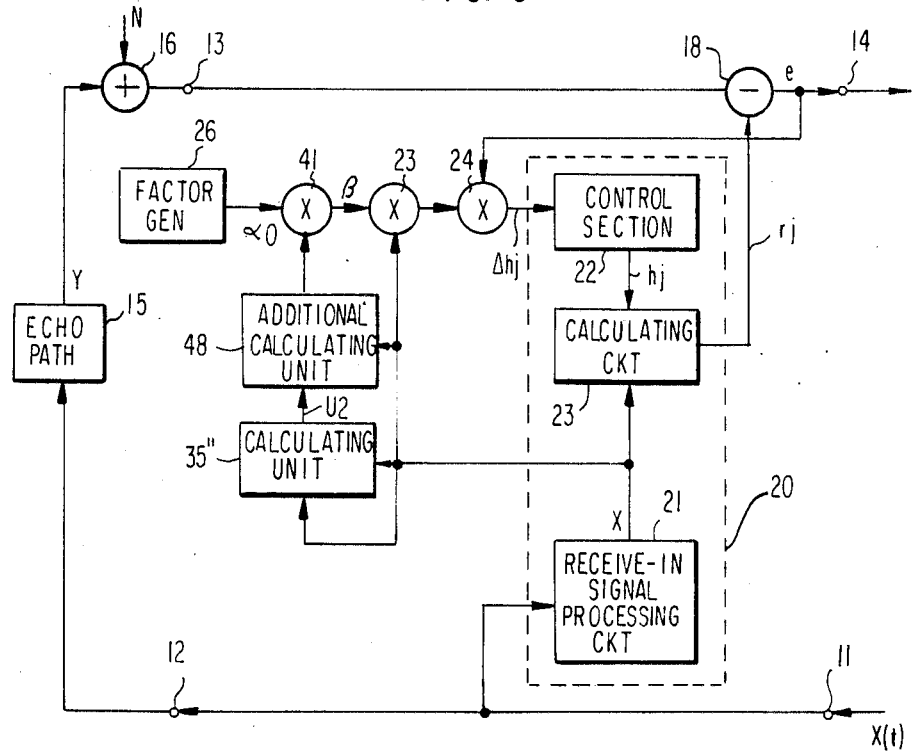
FIG. 6 shows a block diagram of a self-adaptive echo canceller according to a third embodiment of this invention.

Referring to FIG. 6, a self-adaptive echo canceller according to a third embodiment of this invention comprises similar parts designated by like reference numerals. The illustrated echo canceller comprises a calculating unit 35″ responsive to the level signal X for calculating the modifier M represented by $(2\overline{X^2})/(B+\overline{X^2})$ to produce a unit output signal $U_2$ representative of the modifier M. Such a calculating unit 35″ may comprise a read-only memory. The unit output signal $U_2$ is sent to an additional calculating unit 48 responsive to the level signal X. The additional calculating unit 48 comprises a square sum circuit for calculating the square sum $\Sigma X^2$ from the level signal X and a divider for dividing the modifier M by the square sum $\Sigma X^2$ to produce a result signal representative of that result of calculation which is given by $2\overline{X^2}/[(B+\overline{X^2})\Sigma X^2]$. The result signal is multiplied by the error-correcting factor $\alpha_0$ in the third multiplier 41, as is the case with FIG. 4.

In FIGS. 2, 4, and 6, a combination of the level signal producing circuit 21, the coefficient calculating circuit 28, 35, and 30, and the signal modifying circuit 31, 32, 22, and 23 is called an echo signal estimating circuit. Responsive to the factor signal ($\alpha 0$), the receive-in signal X(t), and the send-out signal (e), the echo signal estimating circuit estimates the echo signal Y and produces an echo estimation signal $r_j$. When used in the self-adaptive echo canceller illustrated with reference to FIG. 2, 4, or 6, the learning identification technique is used to make the estimated echo path characteristic equal to the echo path characteristic and to produce the echo estimation signal $r_j$ in the manner described before. The learning identification technique is therefore used in exempting the send-out signal (e) from the echo signal Y.

While this invention has thus far been described in conjunction with a few embodiments thereof, it will readily be possible for those skilled in the art to put this invention into practice in various manners. For example, the third multiplier 41 illustrated in FIGS. 4 and 6 may be a divider. The error signal e may directly be multiplied by the modifier. In this event, the unit, such as 35, 35′, and 35″, may operatively be coupled to the receive-in signal processing section 21.

What is claimed is:

1. In a self-adaptive echo canceller responsive to a receive-in and a send-in signal for producing a send-out signal having a variable outgoing level, with an echo signal substantially cancelled in said send-out signal by the use of a learning identification technique implemented by echo signal estimating means responsive to a factor signal representative of a factor and to said receive-in and said send-out signals for estimating said echo signal to produce an echo estimation signal, said echo canceller including subtracting means for subtracting said echo estimation signal from said send-in signal to produce said send-out signal, said echo signal estimating means including level signal producing means responsive to said receive-in signal for producing a level signal representative of a variable incoming level of said receive-in signal, the improvement wherein said echo signal estimating means comprises:

coefficient calculating means responsive to said factor signal and said level signal for calculating a coefficient and ouputting a coefficient signal representative of said coefficient, said coefficient being calculated by:

$$\beta = 2\alpha_0 \overline{X^2}/(K+\overline{X^2})\Sigma X^2,$$

where $\beta$ represents said coefficient; $\alpha_0$ represents said factor; X represents said variable incoming level; $\overline{X^2}$, represents a mean square of said variable incoming level; and K represents a constant when an amount of modification is defined by:

$$\Delta h_1 = \beta eX.$$

where $\Delta h_1$ represents said amount of modification and e represents said variable outgoing level;

first means responsive to said coefficient signal and said level signal for calculating a product determined by said coefficient and said variable incoming level to produce a product signal representative of said product;

second means responsive to said product signal and said send-out signal for producing a local output signal dependent on said coefficient and said variable outgoing level; and means responsive to said local output signal for providing said echo estimation signal to said subtractor.

2. In a self-adaptive echo canceller responsive to a receive-in signal having a variable incoming level and a send-in signal for producing a send-out signal having an outgoing level, said send-in signal including an echo signal which results from said receive-in signal in an echo path having an echo path characteristic, said echo canceller being for substantially removing said echo signal from said send-out signal by the use of a learning identification technique for estimating said echo path characteristic to define an estimated echo path characteristic by using a preselected coefficient and to produce an echo estimation signal in accordance with said estimated echo path characteristic, said preselected coefficient being successively modified by an amount of modification calculated by using a predetermined factor, said variable incoming level, and said outgoing level, said echo canceller comprising factor producing means for producing a factor signal representative of said predetermined factor, level signal producing means responsive to said receive-in signal for producing a level signal representative of said variable incoming level, calculating means responsive to said factor signal, said level signal, and said send-out signal for calculating said amount of modification to produce a modification signal representative of said amount of modification, echo estimating means responsive to said modification signal and said level signal for estimating said estimated echo path characteristic to produce said echo estimation signal, and output means responsive to said echo estimation signal and said send-in signal for producing said send-out signal, the improvement wherein said calculating means comprises:

first means coupled to said factor producing means and said level signal producing means for calculating a modifier and for producing a coefficient signal representative of a quotient which is equal to a product of said predetermined factor and said modifier divided by a square sum of said incoming level, said modifier being calculated according to:

$$M = 2\overline{X^2}/(K + \overline{X^2}).$$

where M represents said modifier; $\overline{X^2}$, a mean square of said incoming level; and K, a constant; and second means responsive to said coefficient signal, said level signal and said send-out signal for producing said modification signal.

3. A self adaptive echo canceller responsive to a receive-in signal and a send-in signal for producing a send-out signal, having a variable outgoing level, from which any echo signal resulting from said receive-in signal is substantially cancelled, said canceller including:

echo estimating means which implements a learning identification technique, said estimating means being responsive to a factor signal representative of a factor, to said receive-in signal and to said send-out signal for producing an estimated signal, and said estimating means including level signal producing means responsive to said receive-in signal for producing a level signal representative of the variable incoming level of said receive-in signal, subtracting means for subtracting said estimated echo signal from said send-in signal to produce said send-out signal, the improvement wherein said estimating means comprises:

coefficient calculating means responsive to said factor signal and said level signal for calculating a coefficient and outputting a coefficient signal representative of said coefficient, said coefficient being calculated by:

$$\beta = 2\alpha_0 \overline{X^2}/(K + \overline{X^2})\Sigma X^2,$$

where $\beta$ represents said coefficient; $\alpha_0$ represents said factor; X represents said variable incoming level; $\overline{X^2}$, represents a mean square of said variable incoming level; and K represents a constant when an amount of modification is defined by:

$$\Delta h_1 = \beta e X,$$

where $\Delta h_1$ represents said amount of modification and e represents said variable outgoing level;

first means responsive to said coefficient signal and said level signal for calculating a product determined by said coefficient and said variable incoming level to produce a product signal representative of said product;

second means responsive to said product signal and said send-out signal for producing a local output signal dependent on said coefficient and said variable outgoing level; and means responsive to said local output signal for providing said echo estimation signal to said subtractor.

4. A self adaptive echo canceller, responsive to a receive-in signal having a variable amplitude and to a send-in signal, for producing a send-out signal, wherein said send-in signal includes an echo signal which results from said receive-in signal in an echo path having an echo path characteristic, said echo canceller being adapted to substantially remove said echo signal from said send-out signal through an adaptive process, which estimates the echo path characteristics with respect to a preselected coefficient that is successively modified according to a prescribed formula that is a function of a predetermined factor and said receive-in signal having a variable amplitude, and to produce an estimated echo signal, said echo canceller comprising:

factor producing means for producing a factor signal representative of said predetermined factor, level signal means responsive to said receive-in signal for producing a level signal, calculating means responsive to said factor signal, said level signal, and said send-out signal for calculating the amount by which said coefficient is to be modified and for producing a modification signal, echo estimation means responsive to said modification signal and to said level signal for producing said echo estimation signal, and output means responsive to said echo estimation signal and said send-in signal for producing said send-out signal, the improvement wherein said calculating means comprises means operatively coupled to said level signal producing means for calculating the amount by which said coefficient is to be modified in response to variations in said receive-in signal amplitude, said amount of coefficient modification being calculated according to:

$$M = 2\overline{X^2}/(K + \overline{X^2}),$$

where M represents said amount of modification; $\overline{X^2}$, a mean square of said level signal; and K, a constant.

* * * * *

UNITED STATES PATENT AND TRADEMARK OFFICE
CERTIFICATE OF CORRECTION

PATENT NO. : 4,648,111

DATED : March 3, 1987

INVENTOR(S) : Yoshinori Ito

It is certified that error appears in the above-identified patent and that said Letters Patent is hereby corrected as shown below:

In the Abstract  line 1, delete "adpative" and insert --adaptive--;

Column 4, line 28, delete "corrected" and insert --carried--;

Column 4, line 38, delete "source" and insert --square--;

Column 8, line 14, delete "ouputting" and insert --outputting--;

Column 10, lines 13-14, after "signal" delete "to said subtractor".

Signed and Sealed this

Fifteenth Day of March, 1988

*Attest:*

DONALD J. QUIGG

*Attesting Officer*    Commissioner of Patents and Trademarks